US012479383B2

(12) United States Patent
Rivolta et al.

(10) Patent No.: US 12,479,383 B2
(45) Date of Patent: Nov. 25, 2025

(54) IN-SENSOR CRASH DETECTION WITH MOTION SENSORS

(71) Applicant: STMicroelectronics International N.V., Geneva (CH)

(72) Inventors: Stefano Paolo Rivolta, Desio (IT); Federico Rizzardini, Settimo Milanese (IT); Marco Bianco, Cesano Boscone (IT)

(73) Assignee: STMicroelectronics International N.V., Geneva (CH)

( * ) Notice: Subject to any disclaimer, the term of this patent is extended or adjusted under 35 U.S.C. 154(b) by 232 days.

(21) Appl. No.: 18/317,795

(22) Filed: May 15, 2023

(65) Prior Publication Data

US 2024/0383429 A1  Nov. 21, 2024

(51) Int. Cl.
*B60R 22/00* (2006.01)
*B60R 21/0132* (2006.01)

(52) U.S. Cl.
CPC ................ *B60R 21/0132* (2013.01)

(58) Field of Classification Search
CPC ............... B60R 21/0132; B60R 21/01; B60R 2021/0027
See application file for complete search history.

(56) References Cited

U.S. PATENT DOCUMENTS

| 7,162,345 B2 | 1/2007 | Matsunaga et al. |
| 9,776,589 B2 | 10/2017 | Modi et al. |
| 10,292,064 B2 | 5/2019 | Yang et al. |
| 2013/0338897 A1 | 12/2013 | Schwartz et al. |
| 2016/0094964 A1* | 3/2016 | Barfield, Jr. ............ H04W 4/90 340/870.07 |
| 2020/0294401 A1 | 9/2020 | Kerecsen |
| 2021/0049837 A1* | 2/2021 | Karnik .................. G07C 5/008 |

(Continued)

FOREIGN PATENT DOCUMENTS

DE    102004057689 A1    6/2006

OTHER PUBLICATIONS

Cervantes-Villanueva et al., "Vehicle Maneuver Detection with Accelerometer-Based Classification," *Sensors* 16:1618, 2016. (24 pages).

(Continued)

*Primary Examiner* — Adam M Alharbi
(74) *Attorney, Agent, or Firm* — Seed Intellectual Property Law Group LLP

(57) ABSTRACT

A crash detection system includes first and second sensors and a processor. The processor receives first sensor data output by the first sensor, determines whether the first sensor data indicates a first class or a second class, outputs an enable signal to the second sensor if the first sensor data indicates the second class, receives second sensor data output by the second sensor after the enable signal is output, determines whether the second sensor data indicates a high acceleration value, determines whether the first sensor data indicates the first class within a predetermined amount of time after the second sensor data is determined to indicate the high acceleration value, and outputs a signal indicating a crash has occurred in response to determining that the first sensor data indicates the first class within the predetermined amount of time after the second sensor data is determined to indicate the high acceleration value.

20 Claims, 6 Drawing Sheets

(56) References Cited

U.S. PATENT DOCUMENTS

| | | |
|---|---|---|
| 2021/0390798 A1 | 12/2021 | Schmitt et al. |
| 2022/0207987 A1 | 6/2022 | Lee et al. |
| 2022/0381564 A1 | 12/2022 | Kitchen et al. |
| 2023/0085552 A1 | 3/2023 | Schnee et al. |
| 2023/0109452 A1 | 4/2023 | Bellas et al. |
| 2024/0198847 A1* | 6/2024 | Mocanu ............... B60R 21/013 |

OTHER PUBLICATIONS

Lu et al., "Vehicle Mode and Driving Activity Detection Based on Analyzing Sensor Data of Smartphones," *Sensors* 18:1036, 2018. (25 pages).

Sharma, "Automatic Crash Detection System," *Journal of Emerging Technologies and Innovative Research* 6(3):475-481, Mar. 2019.

Stogaitis, Detecting a Vehicle Crash Using a Mobile Computing Device, Technical Disclosure Commons, Oct. 15, 2019. (11 pages).

* cited by examiner

IN-SENSOR CRASH DETECTION WITH MOTION SENSORS

BACKGROUND

Technical Field

The present disclosure relates generally to crash detection systems, and more particularly to crash detection systems that can detect a crash without receiving input from external devices.

Description of the Related Art

Conventionally, a Car Crash Detection (CCD) feature is used to automatically help a user in the event that the user is involved in a car accident. For example, a CCD feature typically calls for medical help if a car accident is detected.

Existing car crash detection systems use a so-called "high-g" accelerometer in order to measure peak acceleration that results from an accident, which could reach more than 100 g (i.e., one hundred times the force of gravity). Also, existing car crash detection systems included in smartphone devices use information that comes from multiple external devices, including a Global Positioning System (GPS) receiver, a plurality of motion sensors, and a microphone. For example, an existing car crash detection system uses location information from a GPS receiver to determine whether a vehicle (e.g., an automobile) is moving, uses data from the motion sensors to evaluate a peak acceleration during an impact from an accident, and uses data from the microphone to capture audio signal of the accident. If the GPS receiver is not able to receive a GPS signal from a GPS satellite, existing car crash detection systems may not be able to determine whether the vehicle is moving and, thus, may not be able to determine whether an accident has occurred. If an existing car crash detection system is operating on a smartphone that is kept highly isolated from a surrounding environment (e.g., in a pocket of a user), the existing car crash detection system may not be able to obtain audio data indicating that an accident has occurred. Accordingly, existing car crash detection systems rely on signals received from external devices, which might not always be available or might not always be ideal for car crash detection.

In addition, existing car crash detection systems fuse information at a system level (e.g., Android service). Accordingly, existing car crash detection systems consume a relatively large amount of power.

BRIEF SUMMARY

The present disclosure provides crash detection systems, methods, and processor-readable media that do not rely on signals received from external devices and, therefore, do not suffer from the drawbacks of conventional CCD systems discussed above. Additionally, the present disclosure provides crash detection systems, methods, and processor-readable media that enable less power to be consumed than is consumed by conventional CCD systems.

One or more embodiments according to the present disclosure provide a crash detection system that can be used in a smartphone to determine whether the smartphone is involved in a crash (e.g., car crash) using a combination of activity recognition based on motion sensors data and high-shock detection based on accelerometer data. Also, one or more embodiments according to the present disclosure provide a crash detection system that can be used in a vehicle control unit (e.g., car control unit) to determine whether the vehicle is involved in a crash using a combination of vehicle stationary detection based on motion sensors data and high-shock detection based on accelerometer data.

A crash detection system according to the present disclosure may be characterized as including: a first sensor which, in operation, outputs first sensor data; a second sensor which, in operation, outputs second sensor data; and a processor coupled to the first sensor and the second sensor. The processor, in operation: receives the first sensor data, determines whether the first sensor data indicates a first class or a second class, outputs an enable signal to the second sensor in response to determining that the first sensor data indicates the second class, receives the second sensor data after the enable signal is output to the second sensor, determines whether the second sensor data indicates a detected acceleration value that is greater than or equal to a threshold acceleration value, determines whether the first sensor data indicates the first class within a predetermined amount of time after the second sensor data is determined to indicate the detected acceleration value that is greater than or equal to the threshold acceleration value, and outputs a signal indicating a crash has occurred in response to determining that the first sensor data indicates the first class within the predetermined amount of time after the second sensor data is determined to indicate the detected acceleration value that is greater than or equal to the threshold acceleration value.

A method of operating a crash detection system according to the present disclosure may be characterized as including: receiving, by a processor, first sensor data output by a first sensor; determining, by the processor, whether the first sensor data indicates a first class or a second class; outputting, by the processor, an enable signal to a second sensor in response to determining that the first sensor data indicates the second class; receiving, by the processor, second sensor data output by the second sensor after the enable signal is output to the second sensor; determining, by the processor, whether the second sensor data indicates a detected acceleration value that is greater than or equal to a threshold acceleration value; determining, by the processor, whether the first sensor data indicates the first class within a predetermined amount of time after the second sensor data is determined to indicate the detected acceleration value that is greater than or equal to the threshold acceleration value; and outputting, by the processor, a signal indicating a crash has occurred in response to determining that the first sensor data indicates the first class within the predetermined amount of time after the second sensor data is determined to indicate the detected acceleration value that is greater than or equal to the threshold acceleration value.

A non-transitory processor-readable storage medium according to the present disclosure may be characterized as storing instructions that, when executed by a processor, cause the processor to: determine whether first sensor data output by a first sensor indicates a first class or a second class, output an enable signal to a second sensor in response to determining that the first sensor data indicates the second class, determine whether second sensor data output by the second sensor after the enable signal is output to the second sensor indicates a detected acceleration value that is greater than or equal to a threshold acceleration value, determine whether the first sensor data indicates the first class within a predetermined amount of time after the second sensor data is determined to indicate the detected acceleration value that is greater than or equal to the threshold acceleration value, and output a signal indicating a crash has occurred in response to determining that the first sensor data indicates the first class within the predetermined amount of time after the second sensor data is determined to indicate the detected acceleration value that is greater than or equal to the threshold acceleration value.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

Embodiments according to the present disclosure may use a combination of activity recognition based on motions sensor data, high shock detection based and accelerometer data, and a state machine. In order to detect a crash event, a high shock must be detected when an activity recognition block (or a vehicle stationary detection block) is detecting a "driving" class (or a "moving" class). A high shock detector block is enabled when needed in order to save power. After an accident, a vehicle suddenly becomes stationary. Therefore, the activity recognition block (or the vehicle stationary detection block) will detect an "other" class (or a "stationary" class). After the high shock is detected, a timer is started to give enough time to the activity recognition block (or the vehicle stationary detection block) to detect the "other" class (or the "stationary" class). If the timer reaches a timeout value, which is higher than a latency required by the activity recognition block to detect the "other" class or by the vehicle stationary detection block to detect the "stationary" class, the high-shock event is discarded because it is considered as a false positive.

Figure 1A:
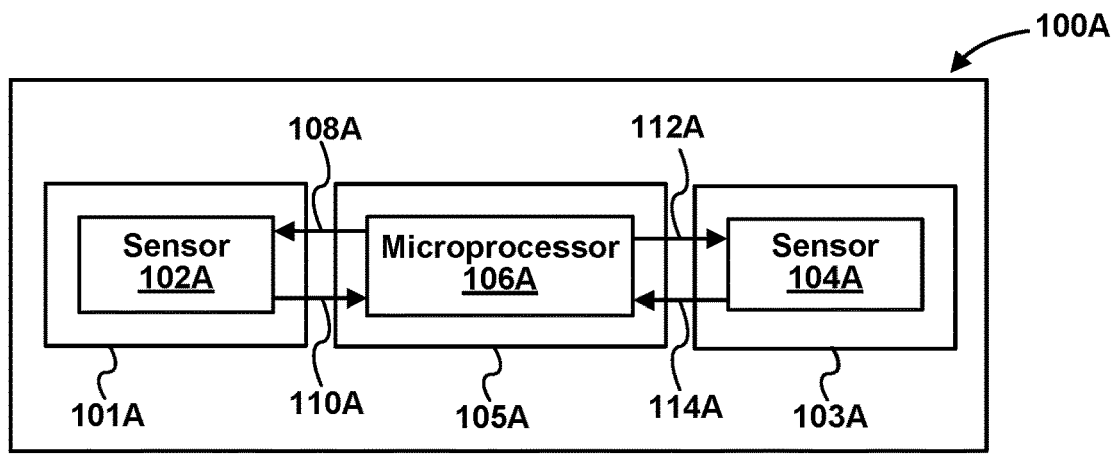
FIGS. 1A, 1B, and 1C show examples of crash detection systems according to embodiments of the present disclosure.
Figure 1B:
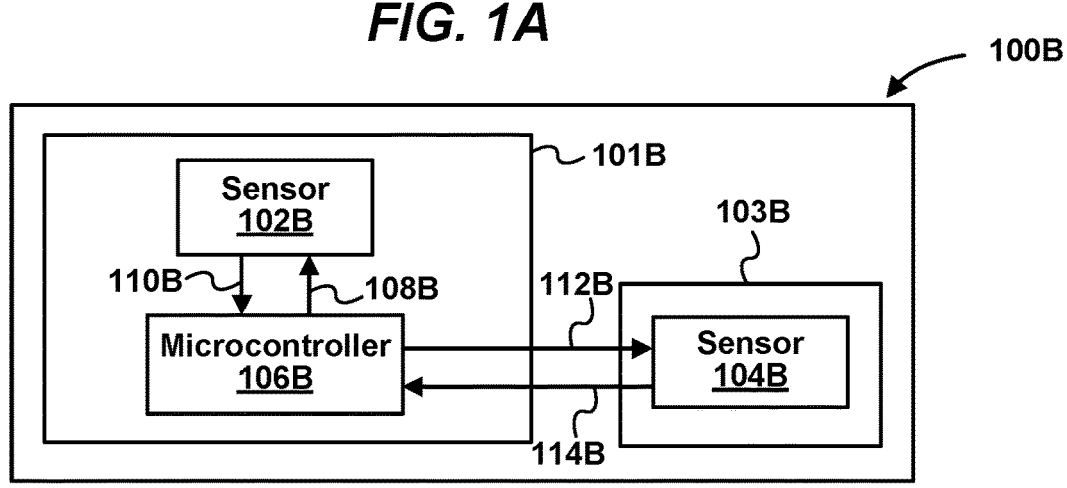
Figure 1C:
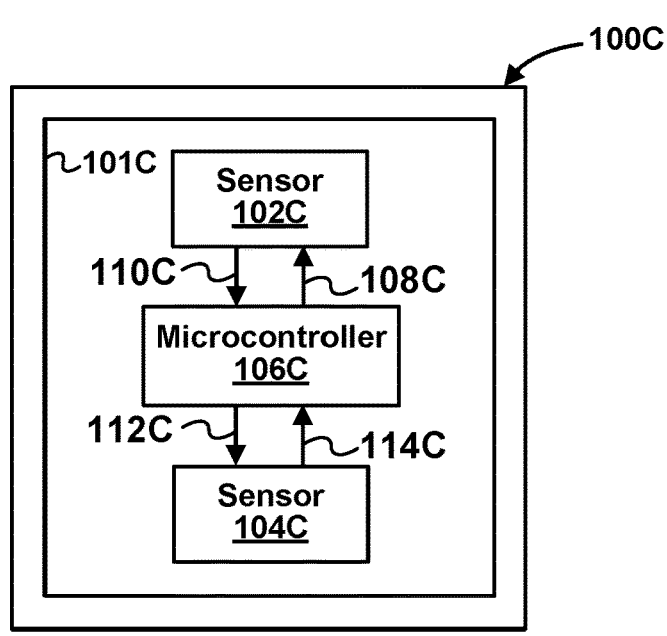

FIGS. 1A, 1B, and 1C show examples of crash detection systems according to embodiments of the present disclosure. More particularly, FIG. 1A shows an example of a crash detection system 100A including an integrated circuit device 101A with a sensor 102A, an integrated circuit device 103A with a sensor 104A, and an integrated circuit device 105A with a microprocessor 106A. The first integrated circuit device 101A, the integrated circuit device 103A, and the integrated circuit device 105A are different from each other.

The microprocessor 106A provides control signal(s) 108A to the sensor 102A, for example, including a control signal that causes the sensor 102A to enter a sleep state, a control signal that causes the sensor 102A to wake up or exit the sleep state, and a control signal that sets one or more detection thresholds in the sensor 102A. The sensor 102A provides data signal(s) 110A to the microprocessor 106A, for example, including sensor data for each axis of a first accelerometer, a second accelerometer, and/or a gyroscope included in the sensor 102A. In one or more embodiments, the sensor 102A provides sensor data at a relatively low rate, for example, a rate that is greater than or equal to 25 Hertz (Hz) (i.e., 25 times per second). The microprocessor 106A provides control signal(s) 112A to the sensor 104A, for example, including a control signal that causes the sensor 104A to enter a sleep state, a control signal that causes the sensor 104A to wake up or exit the sleep state, and a control signal that sets one or more detection thresholds in the sensor 104A. The sensor 104A provides data signal(s) 114A to the microprocessor 106A, for example, including sensor data for each axis of a first accelerometer, a second accelerometer, and/or a gyroscope included in the sensor 104A. In one or more embodiments, the sensor 104A provides sensor data at a relatively high rate, for example, a rate that is greater than or equal to 400 Hz (i.e., 400 times per second). The microprocessor 106A includes at least one processor and at least one memory device storing processor-readable instructions that, when executed by the at least one processor to perform the functions of the microprocessor 106A described herein, which are explained below in connection with FIGS. 2A, 2B, 3A, 3B, 4, 5, and 6.

In one or more embodiments, the sensor 102A is a model number LSM6DSV16X 6-axis inertial measurement unit (IMU) from STMicroelectronics or a model number LIS2DUX12 ultralow-power accelerometer from STMicroelectronics. In one or more embodiments, the sensor 104A is a model number H3LIS331DL high-g, low-power 3-axis digital accelerometer from STMicroelectronics. In one or more embodiments, the microprocessor 106A is a model number STM32MP1 microprocessor from STMicroelectronics. Other models of devices may be used for the sensor 102A, the sensor 104A, and the microprocessor 106A within the scope of the present disclosure.

FIG. 1B shows an example of a crash detection system 100B including an integrated circuit device 101B with a sensor 102B and a microcontroller 106B, and an integrated circuit device 103B with a sensor 104B. The crash detection system 100B shown in FIG. 1B is similar in many relevant respects to the crash detection system 100A shown in FIG. 1A, except that the sensor 102B and the microcontroller 106B are included in the same integrated circuit device 101B, and the sensor 104B is included in the integrated circuit device 103B, which is different from the integrated circuit device 101B.

The sensor 102B and the sensor 104B are similar in many relevant respects to the sensor 102A and the sensor 104A described above. In one or more embodiments, the microcontroller 106B is used to implement a Machine Learning Core (MLC) or a Finite State Machine (FSM) of the integrated circuit device 101B. In another embodiment, the microcontroller 106B is an Intelligent Sensor Processing Unit (ISPU) of the integrated circuit device 101B.

The microcontroller 106B provides control signal(s) 108B to the sensor 102B, which are similar to the control signal(s) 108A described above. The sensor 102B provides data signal(s) 110B to the microcontroller 106B, which are similar to the control signal(s) 110A described above. The microcontroller 106B provides control signal(s) 112B to the sensor 104B, which are similar to the control signal(s) 112A described above. The sensor 104B provides data signal(s) 114B to the microcontroller 106B, which are similar to the control signal(s) 114A described above. The microcontroller 106B includes at least one processor and at least one memory device storing processor-readable instructions that, when executed by the at least one processor to perform the functions of the microcontroller 106B described herein, which are explained below in connection with FIGS. 2A, 2B, 3A, 3B, 4, 5, and 6.

FIG. 1C shows an example of a crash detection system 100C including an integrated circuit device 101C with a sensor 102C, a sensor 104C, and a microcontroller 106C. The crash detection system 100C shown in FIG. 1C is similar in many relevant respects to the crash detection system 100A shown in FIG. 1A and the crash detection system 100B shown in FIG. 1B, except that the sensor 102C, the sensor 104C, and the microcontroller 106C are included in the same integrated circuit device 101C.

The sensor 102C and the sensor 104C are similar in many relevant respects to the sensor 102A and the sensor 104A described above. In one or more embodiments, the microcontroller 106C is used to implement a Machine Learning Core (MLC) or a Finite State Machine (FSM) of the integrated circuit device 101C. In another embodiment, the microcontroller 106C is an Intelligent Sensor Processing Unit (ISPU) of the integrated circuit device 101C.

The microcontroller 106C provides control signal(s) 108C to the sensor 102C, which are similar to the control signal(s) 108A described above. The sensor 102C provides data signal(s) 110C to the microcontroller 106C, which are similar to the control signal(s) 110A described above. The microcontroller 106C provides control signal(s) 112C to the sensor 104C, which are similar to the control signal(s) 112A described above. The sensor 104C provides data signal(s) 114C to the microcontroller 106C, which are similar to the control signal(s) 114A described above. The microcontroller 106C includes at least one processor and at least one memory device storing processor-readable instructions that, when executed by the at least one processor to perform the functions of the microcontroller 106C described herein, which are explained below in connection with FIGS. 2A, 2B, 3A, 3B, 4, 5, and 6.

The crash detection system 100A shown in FIG. 1A, the crash detection system 100B shown in FIG. 1B, and the crash detection system 100C shown in FIG. 1C are referred to herein generally as crash detection system 100 unless a particular one of those systems is being referenced.

Figure 2A:
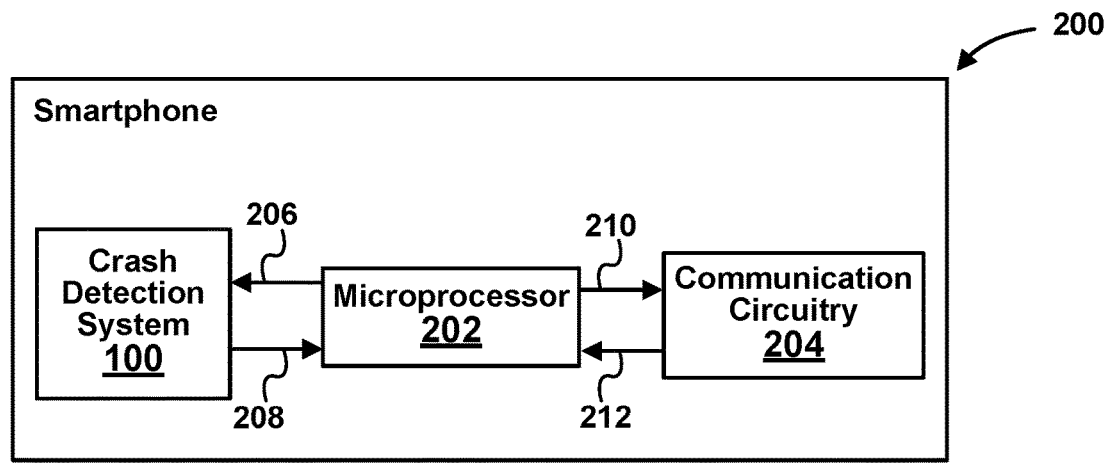
FIGS. 2A and 2B show examples of implementations that include crash detection systems according to embodiments of the present disclosure.
Figure 2B:
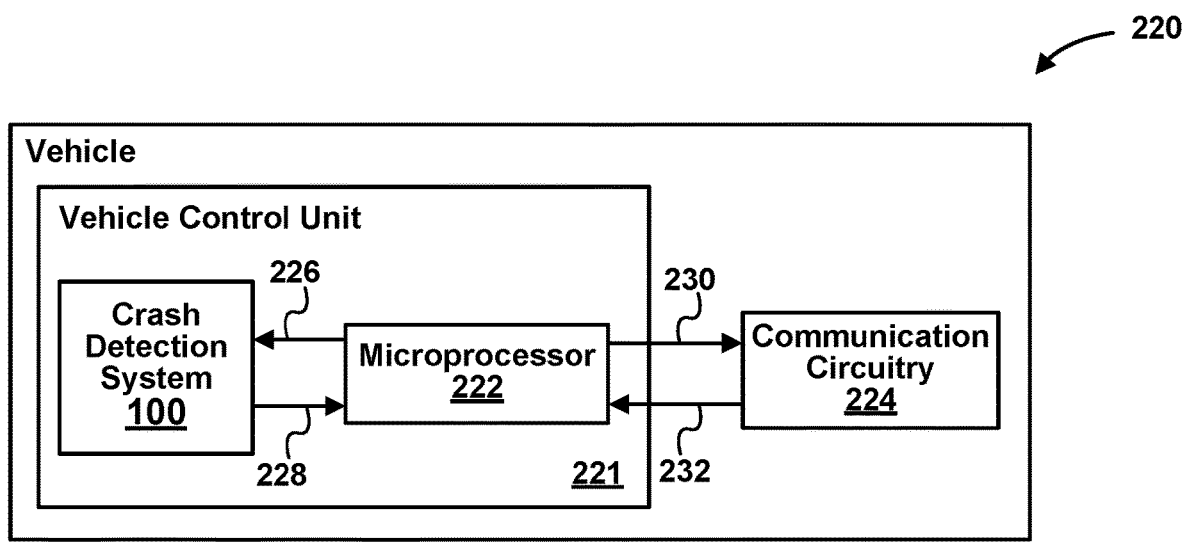

FIGS. 2A and 2B show examples of implementations that include crash detection systems according to embodiments of the present disclosure. More particularly, FIG. 2A shows a smartphone 200 that includes a crash detection system 100, a microprocessor 202, and communication circuitry 204. The microprocessor 202 includes at least one processor and at least one memory device storing processor-readable instructions that, when executed by the at least one processor to perform the functions of the microprocessor 202 described herein. The communication circuitry 204 includes a transmitter, a receiver, and an antenna. In one or more embodiments, the transmitter and the receiver included in the communication circuitry 204 are configured to communicate according to cellular communication standards from the 3rd Generation Partnership Project (3GPP). For example, the transmitter and the receiver included in the communication circuitry 204 are configured to communicate according to Long-Term Evolution (LTE) communication standards, which are fourth-generation (4G) wireless communication standards, and/or communicate according to a fifth-generation (5G) New Radio (NR) wireless communication standards.

The microprocessor 202 provides control signal(s) to the crash detection system 100, which are used to configure the crash detection system 100. The crash detection system 100 provides a crash event signal 208 to the microprocessor 202 when a crash event is detected. In response, the microprocessor 202 provides signal(s) 210 to the communication circuitry 204. The signal(s) 210 causes the communication circuitry 204 to dial a telephone number that connects the smartphone 200 with a local medical center and/or emergency services, such as 911, for example. In addition the signal(s) 210 may include voice data or other data (e.g., text data that identifies a user of the smartphone 200). In one more embodiments, the smartphone 200 includes a location device (e.g., GPS receiver) (not shown), and the signal(s) 210 include data indicating a location (e.g., latitude and longitude) of the smartphone 200. The communication circuitry 204 provides signal(s) 212 to the microprocessor 200. The signal(s) 212 may include audio and/or video data that is output to a speaker (not shown) and/or a display device (not shown) of the smartphone 200.

FIG. 2B shows a vehicle 220 that includes a vehicle control unit 221 with a crash detection system 100, a microprocessor 222, and communication circuitry 224. The vehicle 220 may be a motorcycle, an automobile, a boat, or an airplane, for example. The vehicle control unit 221 is connected to and controls various systems (not shown) of the vehicle 220. In one or more embodiments, the microprocessor 222 and the communication circuitry 224 are similar in many relevant respects to the microprocessor 202 and the communication circuitry 204 discussed above.

Figure 3A:
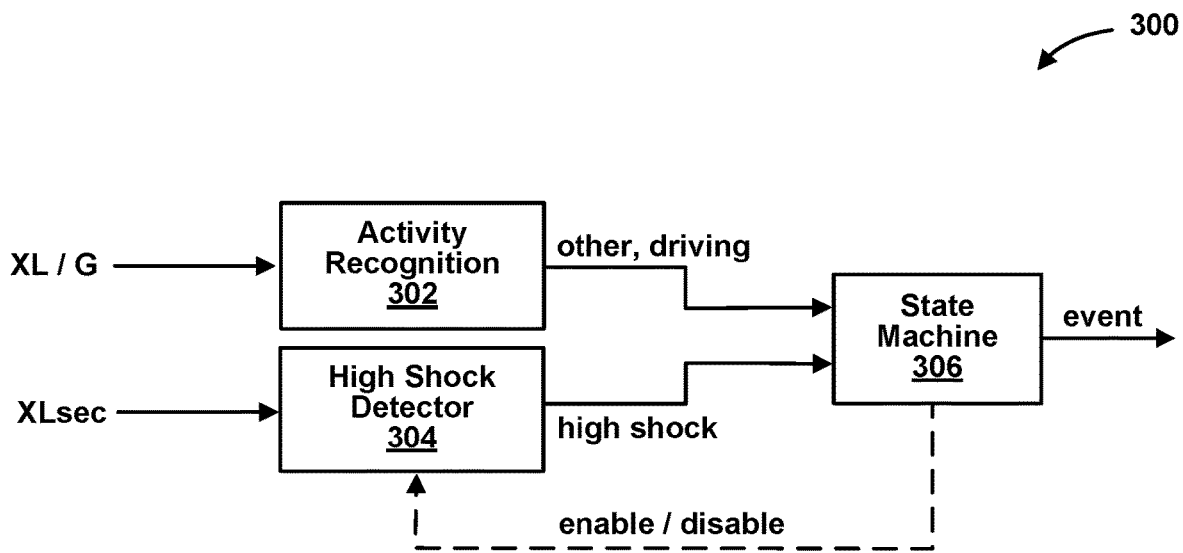
FIGS. 3A and 3B show examples of block diagrams for portions of crash detection systems according to embodiments of the present disclosure.
Figure 3B:
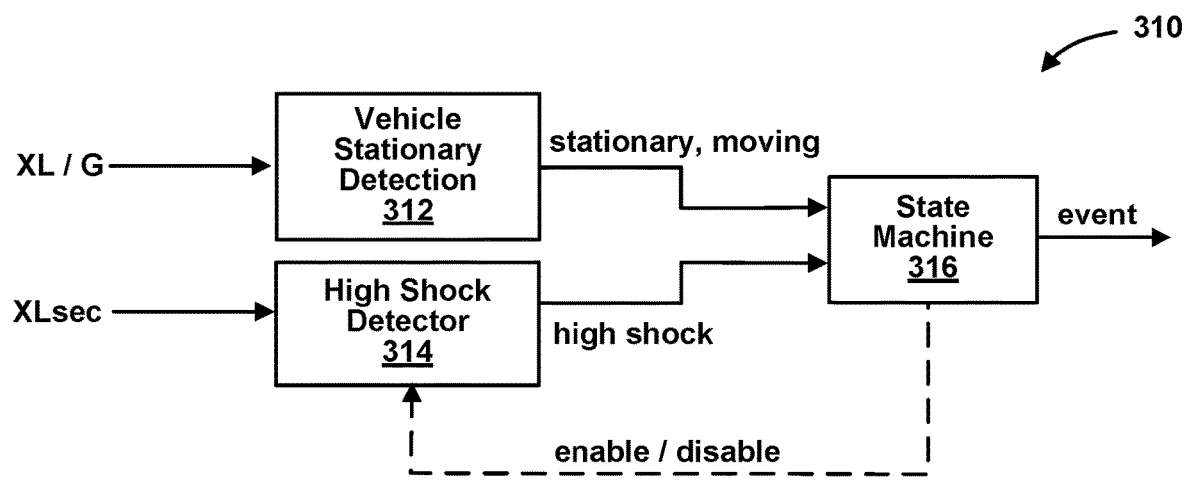

FIGS. 3A and 3B show examples of block diagrams for portions of crash detection systems according to embodiments of the present disclosure. More particularly, FIG. 3A shows a block diagram 300 of a processor (e.g., microprocessor 106A or microcontroller 106B or 106C) used in an embodiment of a crash detection system 100 for a smartphone, such as the smartphone 200 shown in FIG. 2A. The block diagram 300 includes an activity recognition block 302, a high shock detector block 304, and a state machine block 306.

In one example, the activity recognition block 302 is implemented in a machine learning core (MLC) (e.g., running at 30 Hz) of the sensor 102B, the high shock detector block 304 is implemented in a finite state machine (FSM) (e.g., running at 960 Hz) of the sensor 102B, and the state machine block 306 is implemented in a finite state machine (FSM) (e.g., running at 960 Hz) of the sensor 102B. Variance, peak to peak, and peak detector features are computed based on accelerometer norm and norm$^2$ signal on a predetermined time window (e.g., a time window of 60 samples, corresponding to 2 seconds). Decision tree training is performed on approximately 90 hours of collected logs, wherein a class "other" includes user stationary, walking (normal, slow, fast, stairs), running (jogging, sprinting), biking scenarios, and a class "driving" includes a user driving a car scenario. A very compact decision tree is used to avoid overfitting. Experiments have been performed in which raw accuracy of approximately 91% was achieved and meta-classified (5 consecutive windows, corresponding to 10 s) accuracy of approximately 94% was achieved. The total current consumption of the sensor 102B is approximately 200 microamperes (μA), wherein the current consumption of an accelerometer operating in normal mode is approximately 110 µA, the current consumption of the MLC is approximately 5 µA, and the current consumption of the FSM is approximately 85 µA.

In the activity recognition block 302, sensor data XL/G from an accelerometer and/or a gyroscope included in a sensor (e.g., sensor 102A, 102B, or 102C) is received, wherein the sensor data XL/G includes a value of linear acceleration (e.g., specified in digits/g) for each axis of the accelerometer and/or a value of angular velocity (e.g., specified in digits/deg/s) for each axis of the gyroscope included in the sensor. Also, in the activity recognition block 302, a determination is made whether the sensor data XL/G indicates an other than driving class or a driving class, and a signal indicating whether the sensor data is classified as the other than driving class or the driving class is output to the state machine block 306.

In one or more embodiments, artificial intelligence (AI) techniques such as machine learning techniques are used in the activity recognition block 302. For example, the smartphone 200 including the crash detection system 100 is used in a variety of experiments in which the sensor data XL/G is augmented to include indications of whether or not the smartphone is being used while driving, and statistical methods are used to train algorithms to classify whether the sensor data XL/G indicates the other than driving or the driving class.

In the high shock detector block 304, sensor data XLsec from an accelerometer included in a sensor (e.g., sensor 104A, 104B, or 104C) is received, wherein the sensor data XLsec includes a value of linear acceleration for each axis of the accelerometer included in the sensor. In one implementation, the sensor is configured to verify if at least one of the values of the sensor data XLsec exceeds a threshold value (e.g., 30 g). In another implementation, the sensor is configured to continuously output the sensor data XLsec, and a processor determines if at least one of the values of the sensor data XLsec exceeds the threshold value. The same threshold value may be used for each axis of the accelerometer or different threshold values may be used for the axes of the accelerometer. In the high shock detector block 304, a high shock signal is provided to the state machine block 306 if the sensor data XLsec indicates that a high shock event (e.g., a value of linear acceleration for at least one axis of the accelerometer exceeds the threshold value) has been detected. In one embodiment, a check may be implemented on each of the axes of the accelerometer sensor data. For example, using a triaxial accelerometer sensor, the high shock signal is provided to the state machine block 306 if at least one of the accelerometer axis exceeds a configurable threshold (e.g., 15 g). In another embodiment, a check may be implemented on the norm of the accelerometer sensor data. For example, the high shock signal is provided to the state machine block 306 if the norm of the accelerometer data exceeds a configurable threshold (e.g., 25 g). Thresholds may be higher when using a high-g accelerometer sensor (e.g., sensor 104A).

In the state machine block 306, a finite state machine is implemented based on the signals output by the activity recognition block 302 and the high shock detector block 304. As explained in greater detail below in connection with FIG. 4, in the state machine block 306, an enable/disable signal is output to the high shock detector block 304. If the signal output by the activity recognition block 302 indicates the other than driving class, the enable/disable signal has a state (e.g., first voltage level or value) indicating that the high shock detector block 304 is disabled. If the signal output by the activity recognition block 302 indicates the driving class, the enable/disable signal has a state (e.g., second voltage level or value) indicating that the high shock detector block 304 is enabled. While the enable/disable signal indicates that the high shock detector block 304 is disabled, the high shock detector block 304 does not output the high shock signal. While the enable/disable signal indicates that the high shock detector block 304 is enabled, the high shock detector block 304 outputs the high shock signal if a high shock event is detected.

In the state machine block 306, if the signal output by the activity recognition block 302 indicates the driving class while the signal output by the high shock detector block 304 indicates a high shock event, a determination is made whether the signal output by the activity recognition block 302 changes to indicate the other than driving class within a predetermined period of time. If the signal output by the activity recognition block 302 changes to indicate the other than driving class within the predetermined period of time, a crash event signal is output. If the signal output by the activity recognition block 302 does not change to indicate the other than driving class within the predetermined period of time, the crash event signal is not output.

FIG. 3B shows a block diagram 310 of a processor (e.g., microprocessor 106A or microcontroller 106B or 106C) used in an embodiment of a crash detection system 100 for a vehicle, such as the vehicle 220 shown in FIG. 2B. The block diagram 310 includes a vehicle stationary detection block 312, a high shock detector block 314, and a state machine block 316. The vehicle stationary detection block 312 is similar in many relevant respects to the activity recognition block 302 described above except that, in the vehicle stationary detection block 312, a determination is made whether the sensor data XL/G indicates a stationary class or a moving class, and a signal indicating whether the sensor data is classified as the stationary class or the moving class is output to the state machine block 316. The high shock detector block 314 is similar in many relevant respects to the high shock detector block 304 described above.

The state machine block 316 is similar in many relevant respects to the state machine block 306 described above except that, in the state machine block 316, if the signal output by the vehicle stationary detection block 312 indicates the moving class while the signal output by the high shock detector block 314 indicates a high shock event, a determination is made whether the signal output by the vehicle stationary detection block 312 changes to indicate the stationary class within a predetermined period of time. If the signal output by the vehicle stationary detection block 312 changes to indicate the stationary class within the predetermined period of time, a crash event signal is output. If the signal output by the vehicle stationary detection block 312 does not change to indicate the stationary class within the predetermined period of time, the crash event signal is not output. The state machine block 316 is explained in greater detail below in connection with FIG. 5.

Figure 4:
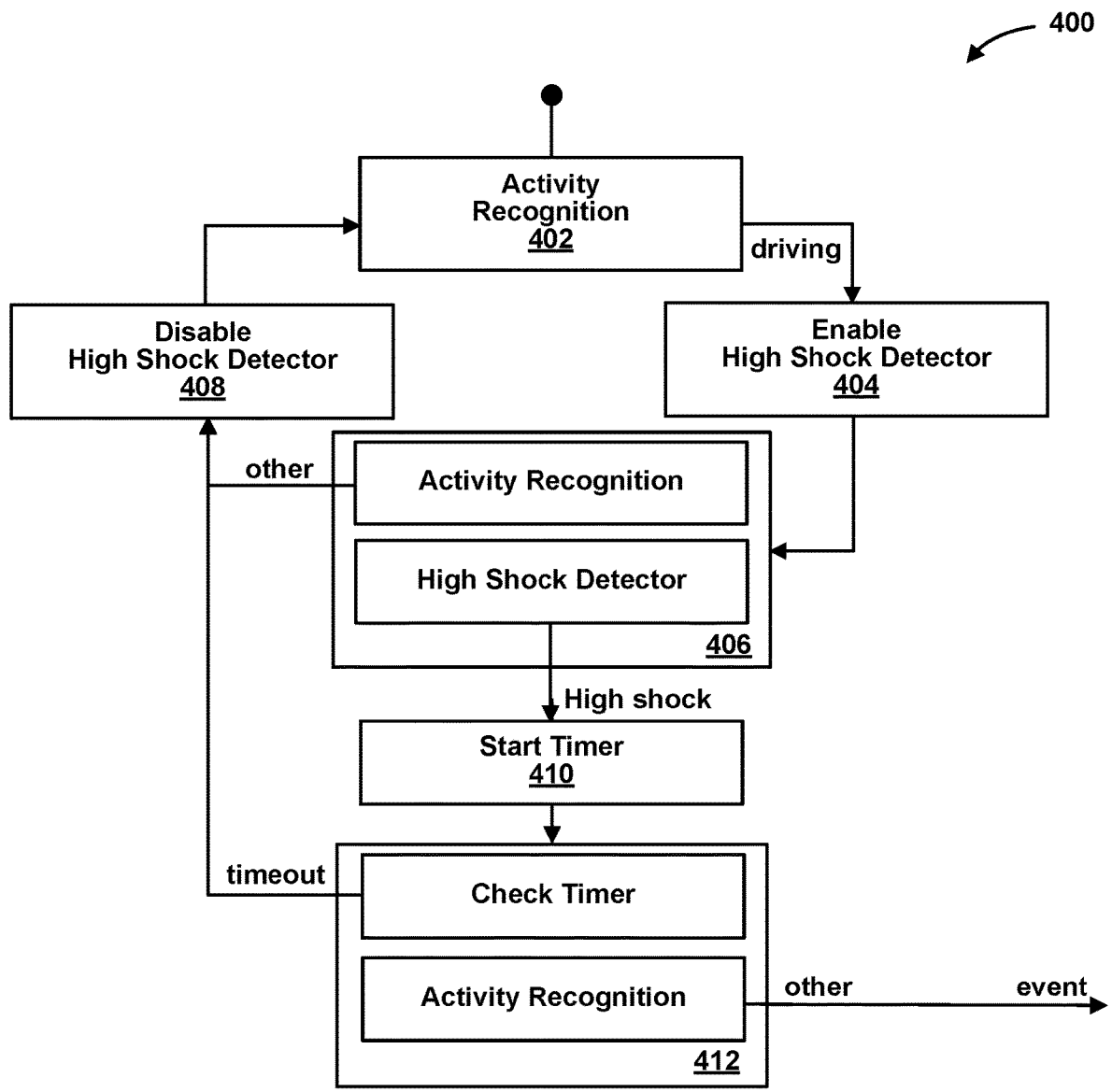
FIG. 4 shows an example of a finite state machine used by a crash detection system according to an embodiment of the present disclosure.

FIG. 4 shows an example of a finite state machine 400 used by a crash detection system according to an embodiment of the present disclosure. The finite state machine 400 corresponds to the block diagram 300 shown in FIG. 3A. Initially, the finite state machine 400 is in an activity recognition state 402 in which the processing of the activity recognition block 302 is performed.

If the signal output by the activity recognition block 302 indicates the driving class, the finite state machine 400 transitions to an enable high shock detector state 404 in which the signal output by the state machine block 306 indicates that the high shock detector block 304 is enabled.

The finite state machine 400 then transitions to an activity recognition processing and high shock detector state 406 in which the processing of the activity recognition block 302 and the processing of the high shock detector block 304 are performed. If the signal output by the activity recognition block 302 changes to indicate the other than driving class, the finite state machine 400 transitions to a disable high shock detector state 408 in which the signal output by the state machine block 306 indicates that the high shock detector block 304 is disabled. The finite state machine 400 then transitions back to the activity recognition state 402.

While the finite state machine 400 is in the activity recognition processing and high shock detector state 406, if the signal output by the activity recognition block 302 does not change to indicate the other than driving class, and the signal output by the high shock detector block 304 indicates a high shock event, the finite state machine 400 transitions to a start timer state 410 in which a timer is started. The finite state machine 400 then transitions to a check timer and activity recognition state 412 in which processing is performed that periodically checks the timer to determine whether the timer has reached a timeout value (e.g., 15 seconds) and the processing of the activity recognition block 302 is performed. The timeout value must be higher than the latency required by the activity recognition block 302 to detect the other than driving class (e.g., 10 seconds).

While the finite state machine 400 is in the check timer and activity recognition state 412, if the timer reaches the timeout value, the finite state machine 400 transitions to the disable high shock detector state 408, and then transitions to the activity recognition state 402. If the timer does not reach the timeout value, and the signal output by the activity recognition block 302 changes to indicate the other than driving class, a signal indicating a crash event is output to the microprocessor 202, which causes the microprocessor 202 to place a call to emergency services via communication circuitry 204 and request assistance, for example.

Figure 5:
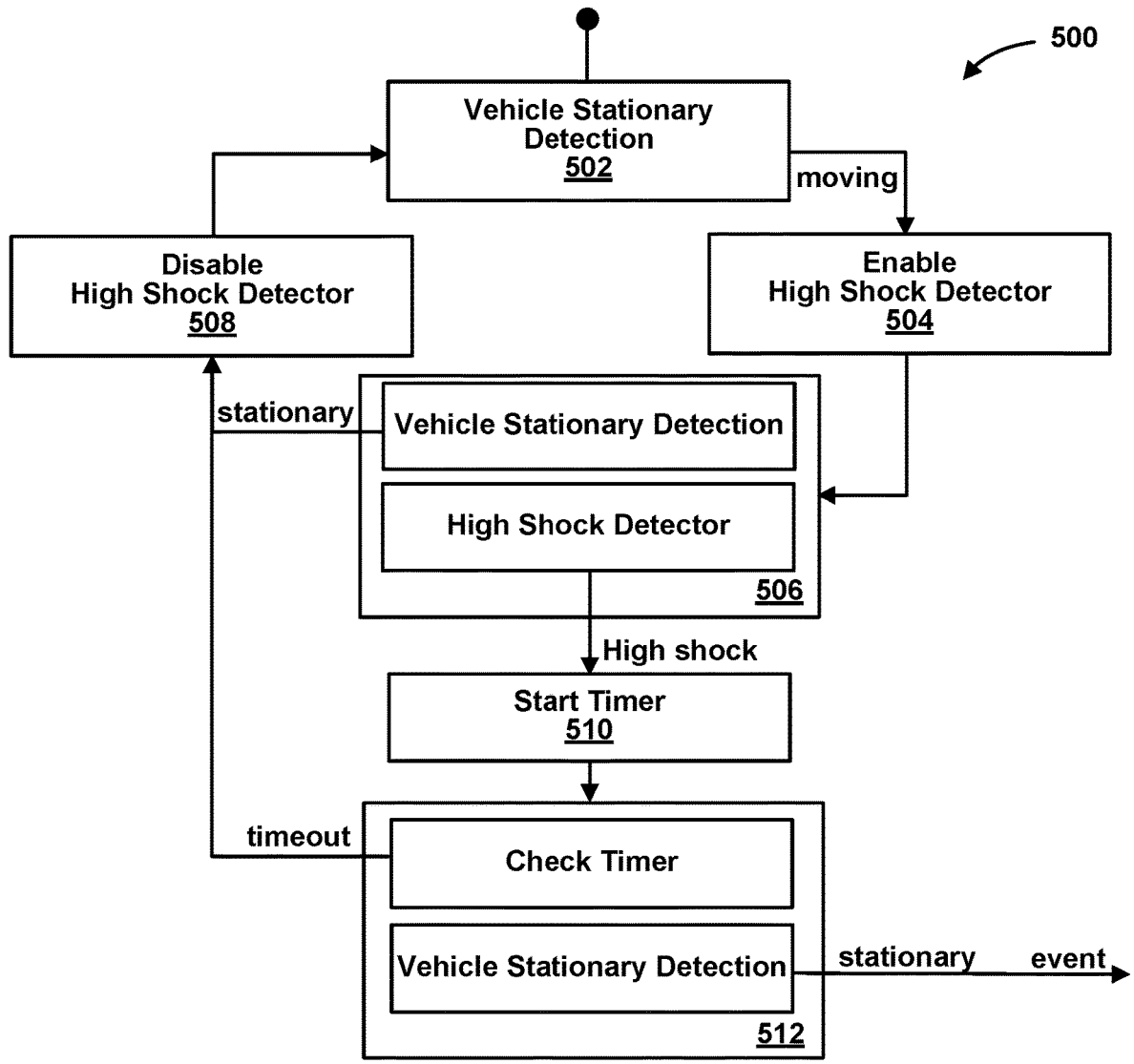
FIG. 5 shows another example of a finite state machine used by a crash detection system according to an embodiment of the present disclosure.

FIG. 5 shows an example of a finite state machine 500 used by a crash detection system according to an embodiment of the present disclosure. The finite state machine 500 corresponds to the block diagram 310 shown in FIG. 3B. Initially, the finite state machine 500 is in a vehicle stationary detection state 502 in which the processing of the vehicle stationary detection block 312 is performed.

If the signal output by the vehicle stationary detection block 312 indicates the moving class, the finite state machine 500 transitions to an enable high shock detector state 504 in which the signal output by the state machine block 316 indicates that the high shock detector block 314 is enabled. The finite state machine 500 then transitions to a vehicle stationary detection processing and high shock detector state 506 in which the processing of the vehicle stationary detection block 312 and the processing of the high shock detector block 314 are performed. If the signal output by the vehicle stationary detection block 312 changes to indicate the stationary class, the finite state machine 500 transitions to a disable high shock detector state 508 in which the signal output by the state machine block 316 indicates that the high shock detector block 314 is disabled. The finite state machine 500 then transitions back to the vehicle stationary detection state 502.

While the finite state machine 500 is in the vehicle stationary detection processing and high shock detector state 506, if the signal output by the vehicle stationary detection block 312 does not changes to indicate the stationary class, and the signal output by the high shock detector block 314 indicates a high shock event, the finite state machine 500 transitions to a start timer state 510 in which a timer is started. The finite state machine 500 then transitions to a check timer and vehicle stationary detection state 512 in which processing is performed that periodically checks the timer to determine whether the timer has reached a timeout value (e.g., 15 seconds) and the processing of the vehicle stationary detection block 312 is performed. The timeout value must be higher than the latency required by the vehicle stationary detection block 312 to detect the stationary class (e.g., 10 seconds).

While the finite state machine 500 is in the check timer and vehicle stationary detection state 512, if the timer reaches the timeout value, the finite state machine 500 transitions to the disable high shock detector state 508, and then transitions to the vehicle stationary detection state 502. If the timer does not reach the timeout value, and the signal output by the vehicle stationary detection block 312 changes to indicate the stationary class, a signal indicating a crash event is output to the microprocessor 222, which causes the microprocessor 222 to place a call to emergency services via the communication circuitry 224 and request assistance, for example.

Figure 6:
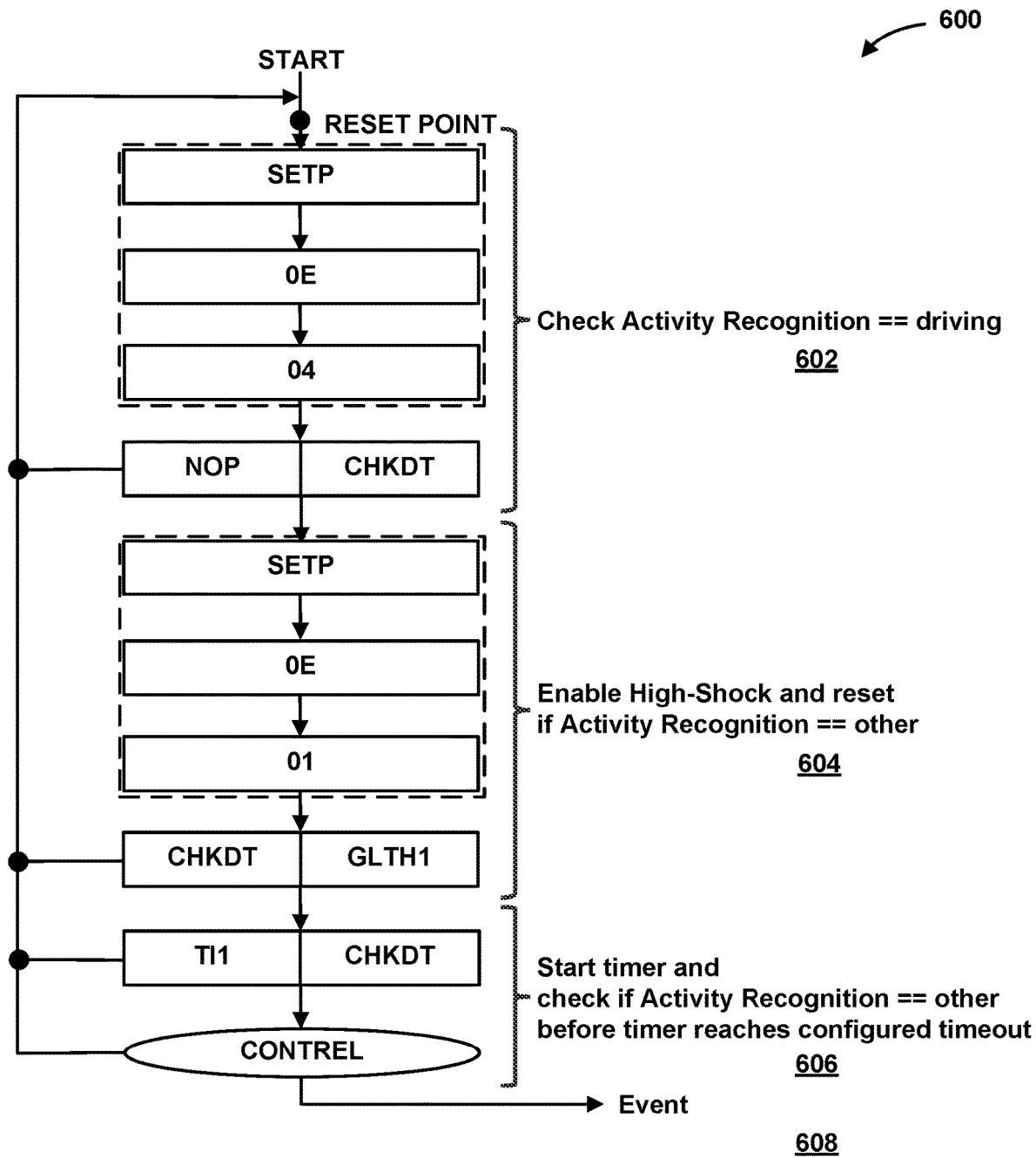
FIG. 6 shows an example of a processing flow in a crash detection system according to an embodiment of the present disclosure.

FIG. 6 shows an example of a processing flow 600 in a crash detection system according to an embodiment of the present disclosure. The processing flow 600 includes processing 602 in which the signal output by the activity recognition block 302 is checked to determine whether it indicates the driving class. The processing flow 600 also includes processing 604 in which the signal output by the state machine block 306 indicates that the high shock detector block 304 is enabled, and the signal output by the activity recognition block 302 is checked to determine whether it indicates the other than driving class to disable the high shock detector block 304 and to reset the processing flow 600. In addition, the processing flow 600 includes processing 606 in which a timer is started and the signal output by the activity recognition block 302 is checked to determine whether it indicates the other than driving class before timer reaches a configured timeout value. Additionally, the processing flow 600 includes processing 608 in which a crash event signal is output.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A crash detection system, comprising:
 a first sensor which, in operation, outputs first sensor data, wherein the first sensor includes a first accelerometer;
 a second sensor which, in operation, outputs second sensor data, wherein the second sensor includes a second accelerometer; and a processor coupled to the first sensor and the second sensor, wherein the processor, in operation:
receives the first sensor data,
determines whether at least one acceleration value included in the first sensor data indicates a first class or a second class,
outputs an enable signal to the second sensor in response to determining that the first sensor data indicates the second class,
receives the second sensor data after the enable signal is output to the second sensor,
determines whether the second sensor data indicates a detected acceleration value that is greater than or equal to a threshold acceleration value,
determines whether the at least one acceleration value included in the first sensor data indicates the first class within a predetermined amount of time after the second sensor data is determined to indicate the detected acceleration value that is greater than or equal to the threshold acceleration value, and
outputs a signal indicating a crash has occurred in response to determining that the first sensor data indicates the first class within the predetermined amount of time after the second sensor data is determined to indicate the detected acceleration value that is greater than or equal to the threshold acceleration value.

2. The crash detection system according to claim 1, wherein the processor, in operation, does not output the signal indicating the crash has occurred in response to determining that the first sensor data indicates the second class within the predetermined amount of time after the second sensor data is determined to indicate the detected acceleration value that is greater than or equal to the threshold acceleration value.

3. The crash detection system according to claim 1, wherein:
the second sensor operates while the enable signal is output by the processor, and
the second sensor does not operate while the enable signal is not output by the processor.

4. The crash detection system according to claim 1, wherein:
the first sensor outputs the first sensor data at a first rate,
the second sensor outputs the second sensor data at a second rate, and
the second rate is greater than the first rate.

5. The crash detection system according to claim 1, wherein:
the first sensor is included in a first integrated circuit device,
the second sensor is included in a second integrated circuit device that is different from the first integrated circuit device, and
the processor is in a third integrated circuit device that is different from the first integrated circuit device and the second integrated circuit device.

6. The crash detection system according to claim 1, wherein:
the first sensor and the processor are included in a first integrated circuit device, and
the second sensor is included in a second integrated circuit device that is different from the first integrated circuit device.

7. The crash detection system according to claim 1, wherein the first sensor, the second sensor, and the processor are included in a same integrated circuit device.

8. The crash detection system according to claim 1, wherein:
the second accelerometer, in operation, detects a larger amount of acceleration than the first accelerometer.

9. The crash detection system according to claim 8, wherein the first sensor includes a gyroscope, and wherein the first sensor data includes output from the first accelerometer and output from the gyroscope.

10. The crash detection system according to claim 1, wherein the first class is an other than driving class and the second class is a driving class, or the first class is a stationary class and the second class is a moving class.

11. A method of operating a crash detection system, the method comprising:
receiving, by a processor, first sensor data output by a first sensor that includes a first accelerometer;
determining, by the processor, whether at least one acceleration value included in the first sensor data indicates a first class or a second class;
outputting, by the processor, an enable signal to a second sensor in response to determining that the first sensor data indicates the second class;
receiving, by the processor, second sensor data output by the second sensor that includes a second accelerometer after the enable signal is output to the second sensor;
determining, by the processor, whether the second sensor data indicates a detected acceleration value that is greater than or equal to a threshold acceleration value;
determining, by the processor, whether the at least one acceleration value included in the first sensor data indicates the first class within a predetermined amount of time after the second sensor data is determined to indicate the detected acceleration value that is greater than or equal to the threshold acceleration value; and
outputting, by the processor, a signal indicating a crash has occurred in response to determining that the first sensor data indicates the first class within the predetermined amount of time after the second sensor data is determined to indicate the detected acceleration value that is greater than or equal to the threshold acceleration value.

12. The method according to claim 11, further comprising:
determining, by the processor, that the first sensor data indicates the second class within the predetermined amount of time after the second sensor data is determined to indicate the detected acceleration value that is greater than or equal to the threshold acceleration value,
wherein the processor does not output the signal indicating the crash has occurred in response to determining that the first sensor data indicates the second class within the predetermined amount of time after the second sensor data is determined to indicate the detected acceleration value that is greater than or equal to the threshold acceleration value.

13. The method according to claim 11, further comprising:
operating, by the second sensor, while the enable signal is output by the processor,
wherein the second sensor does not operate while the enable signal is not output by the processor.

14. The method according to claim 11, further comprising:

outputting, by the first sensor, the first sensor data at a first rate; and outputting, by the second sensor, the second sensor data at a second rate, wherein the second rate is greater than the first rate.

15. The method according to claim 11, wherein:

detecting, by the first accelerometer included in the first sensor, a first amount of acceleration; and detecting, by the second accelerometer included in the second sensor, a second amount of acceleration, wherein the second amount of acceleration is greater than the first amount of acceleration.

16. The crash detection system according to claim 15, wherein the first sensor includes a gyroscope, and wherein the first sensor data includes output from the first accelerometer and output from the gyroscope.

17. The method according to claim 11, wherein the first class is an other than driving class and the second class is a driving class, or the first class is a stationary class and the second class is a moving class.

18. A non-transitory processor-readable storage medium storing instructions that, when executed by a processor, cause the processor to:

determine whether at least one acceleration value included in first sensor data output by a first sensor that includes a first accelerometer indicates a first class or a second class, output an enable signal to a second sensor that includes a second accelerometer in response to determining that the first sensor data indicates the second class, determine whether second sensor data output by the second sensor after the enable signal is output to the second sensor indicates a detected acceleration value that is greater than or equal to a threshold acceleration value, determine whether the at least one acceleration value included in the first sensor data indicates the first class within a predetermined amount of time after the second sensor data is determined to indicate the detected acceleration value that is greater than or equal to the threshold acceleration value, and output a signal indicating a crash has occurred in response to determining that the first sensor data indicates the first class within the predetermined amount of time after the second sensor data is determined to indicate the detected acceleration value that is greater than or equal to the threshold acceleration value.

19. The storage medium according to claim 11, wherein the instructions, when executed by a processor, cause the processor to:

determine that the first sensor data indicates the second class within the predetermined amount of time after the second sensor data is determined to indicate the detected acceleration value that is greater than or equal to the threshold acceleration value, wherein the processor does not output the signal indicating the crash has occurred if the first sensor data is determined to indicate the second class within the predetermined amount of time after the second sensor data is determined to indicate the detected acceleration value that is greater than or equal to the threshold acceleration value.

20. The storage medium according to claim 11, wherein the first class is an other than driving class and the second class is a driving class, or the first class is a stationary class and the second class is a moving class.

* * * * *